United States Patent
Ugolini

(10) Patent No.: US 8,857,888 B2
(45) Date of Patent: Oct. 14, 2014

(54) CAR WITH A SUN ROOF PROVIDED WITH INTERNAL AND EXTERNAL VERTICAL POSTS

(75) Inventor: Riccardo Ugolini, San Lazzaro Di Savena (IT)

(73) Assignee: Ferrari S.p.A. (IT)

( * ) Notice: Subject to any disclaimer, the term of this patent is extended or adjusted under 35 U.S.C. 154(b) by 18 days.

(21) Appl. No.: 13/564,207

(22) Filed: Aug. 1, 2012

(65) Prior Publication Data

US 2013/0033068 A1     Feb. 7, 2013

(30) Foreign Application Priority Data

Aug. 1, 2011 (IT) ............... BO2011A0476

(51) Int. Cl.
  *B60J 7/14* (2006.01)
(52) U.S. Cl.
  USPC ........... 296/107.07; 280/756; 296/203.03; 296/146.14
(58) Field of Classification Search
  USPC .......... 296/146.14, 107.17, 108, 193.06, 296/203.03, 216.01, 216.02, 220.01, 296/187.12, 181.4; 280/756
  IPC .................................................. B60J 1/18
  See application file for complete search history.

(56) References Cited

U.S. PATENT DOCUMENTS

| 7,128,363 B2 * | 10/2006 | Fischer | 296/108 |
| 7,172,236 B1 * | 2/2007 | Chevtsov et al. | 296/107.17 |
| 7,404,587 B2 * | 7/2008 | Brockhoff | 296/107.17 |
| 7,621,583 B2 * | 11/2009 | Fallis et al. | 296/108 |
| 2001/0033089 A1 | 10/2001 | Maass | |
| 2003/0178833 A1 * | 9/2003 | Muller | 280/756 |

FOREIGN PATENT DOCUMENTS

| DE | 102004032069 A1 | 1/2006 |
| DE | 102004050514 A1 | 4/2006 |
| EP | 1912815 B1 | 3/2010 |
| EP | 2241466 B1 | 10/2010 |
| EP | 2114712 B1 | 1/2011 |
| WO | WO-2005/061253 A1 | 7/2005 |
| WO | WO-2007/010046 A1 | 1/2007 |
| WO | WO-2008/052727 A1 | 5/2008 |

OTHER PUBLICATIONS

Italian Application Serial No. BO20110476, Search Report dated Jan. 23, 2012, 2 pgs.
"European Application Serial No. 12178909.3, Communication of a Notice of Opposition mailed Apr. 16, 2014", 23 pgs.
"Ferrari S.p. A., Owner's Manual F430 Spider", (Sep. 30, 2005), 10 pgs.

* cited by examiner

*Primary Examiner* — Pinel Romain
(74) *Attorney, Agent, or Firm* — Schwegman Lundberg & Woessner, P.A.

(57) ABSTRACT

A car having: a frame provided with two external vertical posts, which are arranged facing each other on opposite sides of the car, and two internal vertical posts, which are arranged between the two external vertical posts and at a given distance from the external vertical posts; a passenger compartment; a sun roof, which is supported by the frame and can be set in an open position or a closed position with respect to the passenger compartment; a housing for containing the sun roof when the sun roof itself is set in the open position; a movable cover for closing the housing; and a rear window, which is mounted in a sliding manner so as to move between an extracted position, in which the rear window projects from the car body, and a withdrawn position, in which the rear window is housed inside the car body.

20 Claims, 18 Drawing Sheets

CAR WITH A SUN ROOF PROVIDED WITH INTERNAL AND EXTERNAL VERTICAL POSTS

PRIORITY CLAIM AND RELATED APPLICATIONS

This application claims the benefit of priority under 35 U.S.C. Section 119 to Italian Patent Application Serial No. B02011A000476, filed on Aug. 1, 2011, which application is incorporated herein by reference in its entirety.

TECHNICAL FIELD

The present invention relates to a car with a sun roof.

BACKGROUND

Patent EP1912815B1 describes a car with a sun roof, wherein the frame comprises two fixed vertical posts, which are arranged facing each other on opposite sides of the car at a boundary zone between a passenger compartment and a rear engine compartment. The sun roof comprises a pair of rigid roof members, which are mechanically connected to the frame by means of respective connection members arranged at internal walls of the two vertical posts. A rear roof member leans against an upper wall of the two vertical posts when the roof is in a closed position (i.e. when the roof closes the top of the passenger compartment of the car).

It has been observed that the contact zone between the upper walls of the two vertical posts and the rear roof member is rather critical with respect to water infiltrations, because achieving adequate sealing in this contact zone while keeping a pleasant appearance when the roof is in an open position (i.e. when the roof is folded and arranged in a rear housing) is complex. It is worth noting that pleasant appearance is of the utmost importance in a car with sun roof, because these types of cars are chosen essentially for their appearance; furthermore, the vertical post zone is one of the most evident because it is immediately by the side of the door handles, and thus in the line of sight of occupants getting in and out of the car.

OVERVIEW

Examples provide a sun roof which is free from the above-described. drawbacks, and in particular which. is easy and cost-effective to be implemented.

According to certain examples, a car with sun roof is provided as claimed in the appended claims.

BRIEF DESCRIPTION OF THE DRAWINGS

The present invention will now be described with reference to the accompanying drawings, which show a non-limitative embodiment thereof, in which.

DETAILED DESCRIPTION

Figure 1:
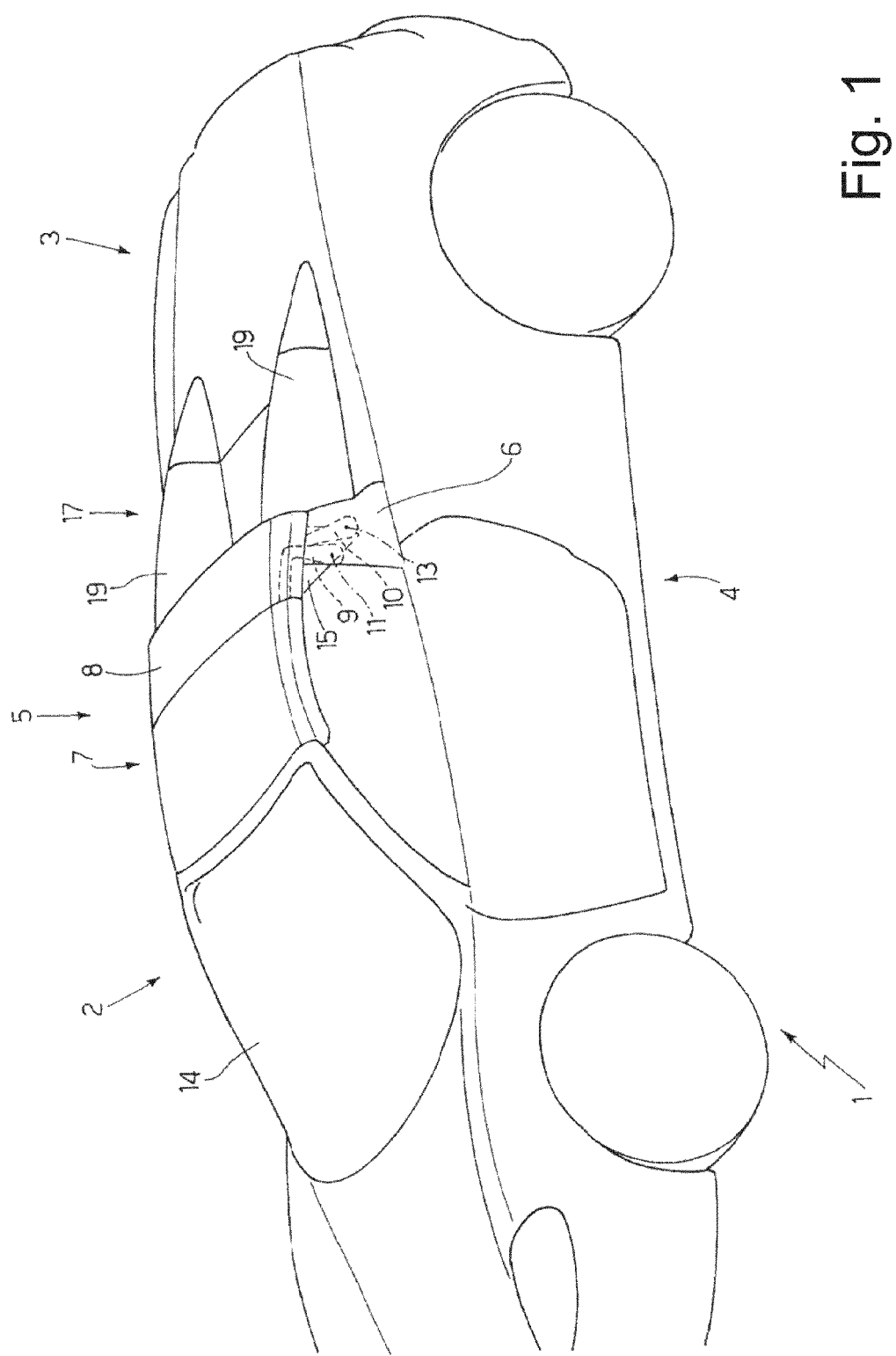
FIG. 1 is a diagrammatic perspective view of a car with sun roof provided in accordance with examples, in which the sun roof is set in a closed position.

In FIG. 1, numeral 1 indicates as a whole a car having a passenger compartment 2 and an engine compartment 3, which is arranged in a central position behind the passenger compartment 2 and is closed by a partially transparent opening cover. A frame 4 of car 1 supports a sun roof 5, which may be set in an open position (shown in FIG. 6), in which the passenger compartment 2 is open, or in a closed position (shown in FIGS. 1 and 3) in which the entire passenger compartment 2 is covered by the sun roof 5.

Figure 2:
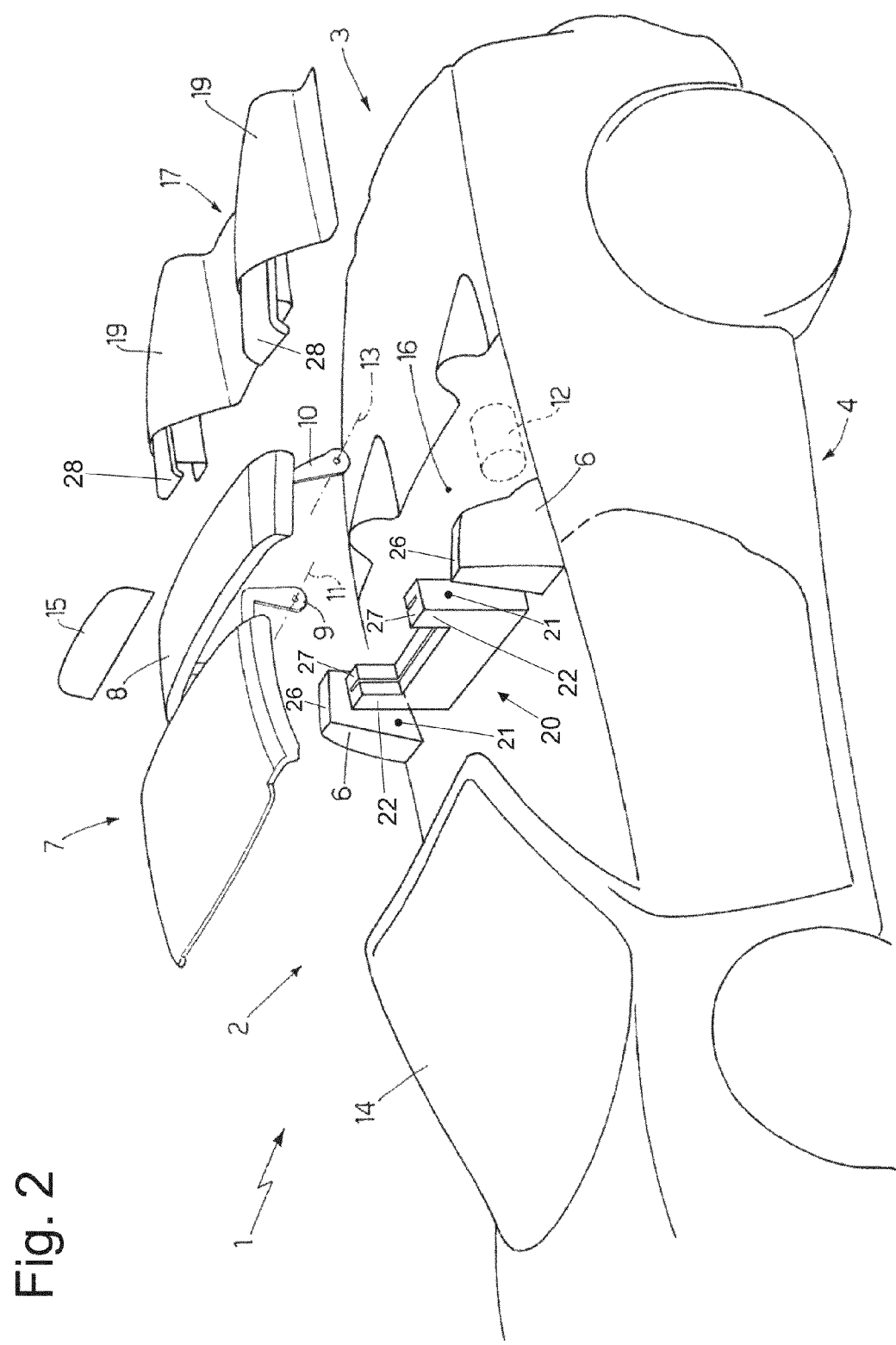
FIG. 2 is a partially exploded view of the sun roof of the car in FIG. 1.

As shown in FIGS. 1 and 2, in order to support the sun roof 5, frame 4 comprises two external vertical posts 6, which vertically project from the belt line of car 1 and face each other on opposite sides of car 1 at a boundary zone between the passenger compartment 2 and the engine compartment 3.

The sun roof 5 comprises a pair of rigid roof members 7 and 8, which are essentially flat, i.e. which have a flat development free from parts or legs projecting the plane, with the exception of minor longitudinal and transversal bumps needed to provide a suitable connection with the other parts of the car body. The roof members 7 and 8 are carried by frame 4, by means of a pair of support members, which are arranged on opposite sides of the roof members 7 and 8 at internal walls of the external vertical posts 6 (i.e. the support members are arranged within the volume laterally delimited by the two external vertical posts 6). In the embodiment shown in the accompanying figures, each roof member 7 and 8 is mechanically connected to frame 4 by means of a pair of connection arms 9 and 10, which are arranged on opposite sides of the roof members 7 and 8 themselves, and form the support members; in particular, each arm 9 or 10 is hinged to frame 4 by means of a respective hinge which is supported both by the external vertical posts 6 and by a portion of frame 4 arranged under the posts 6, and more internally than the posts 6.

In the embodiment shown in the accompanying figures, each arm 9 is "L"-shaped and has one end rigidly fixed to the roof hinge 7 and an opposite end hinged to frame 4 at a post 6 in order to rotate with respect to the frame 4 itself about a horizontal rotation axis 11 under the bias of an actuator device 12. Each arm 10 has a substantially rectilinear shape and has one end rigidly fixed to the roof member 8 and an opposite end hinged to frame 4 at a post 6 in order to rotate with respect the frame 4 itself about a horizontal rotation axis 13 parallel to and offset with respect to the rotation axis 11 under the bias of the actuator device 12. According to a preferred embodiment (not shown), roof member 7 and roof member 8 are connected to frame 4 at the post 6 by means of an articulated quadrilateral so as to perform a rototranslation instead of a simple rotation with respect to the frame 4 itself; in other words, according to a preferred embodiment, the support members of roof members 7 and 8 consist of articulated quadrilaterals. According to the embodiment shown in the accompanying figures, the rotation axes 11 and 13 are fixed rotation axes, i.e. do not undergo any spatial translation; if using articulated quadrilaterals, the rotation axis 11 and the rotation axis 13 are movable, i.e. move in use parallely to themselves.

When the sun roof 5 is set in the closed position (FIGS. 1 and 3), the two roof members 7 and 8 are arranged substantially horizontal and essentially coplanar to each other so as to be seamlessly arranged in sequence. In particular, when the sun roof 5 is set in the closed position (FIGS. 1 and 3), the roof member 7 is arranged in a front position so as to lean the front end thereof in contact with a windscreen 14 of car 1 and to arrange the rear end thereof in contact with the front end of the roof member 8; moreover, the roof member 8 is arranged in a rear position so as to arrange the front end thereof in contact with the rear end of the roof element 7 and to arrange the rear end thereof in contact, at the back, with a rear window 15 of car 1, and laterally with the posts 6 of frame 4.

Figure 3:
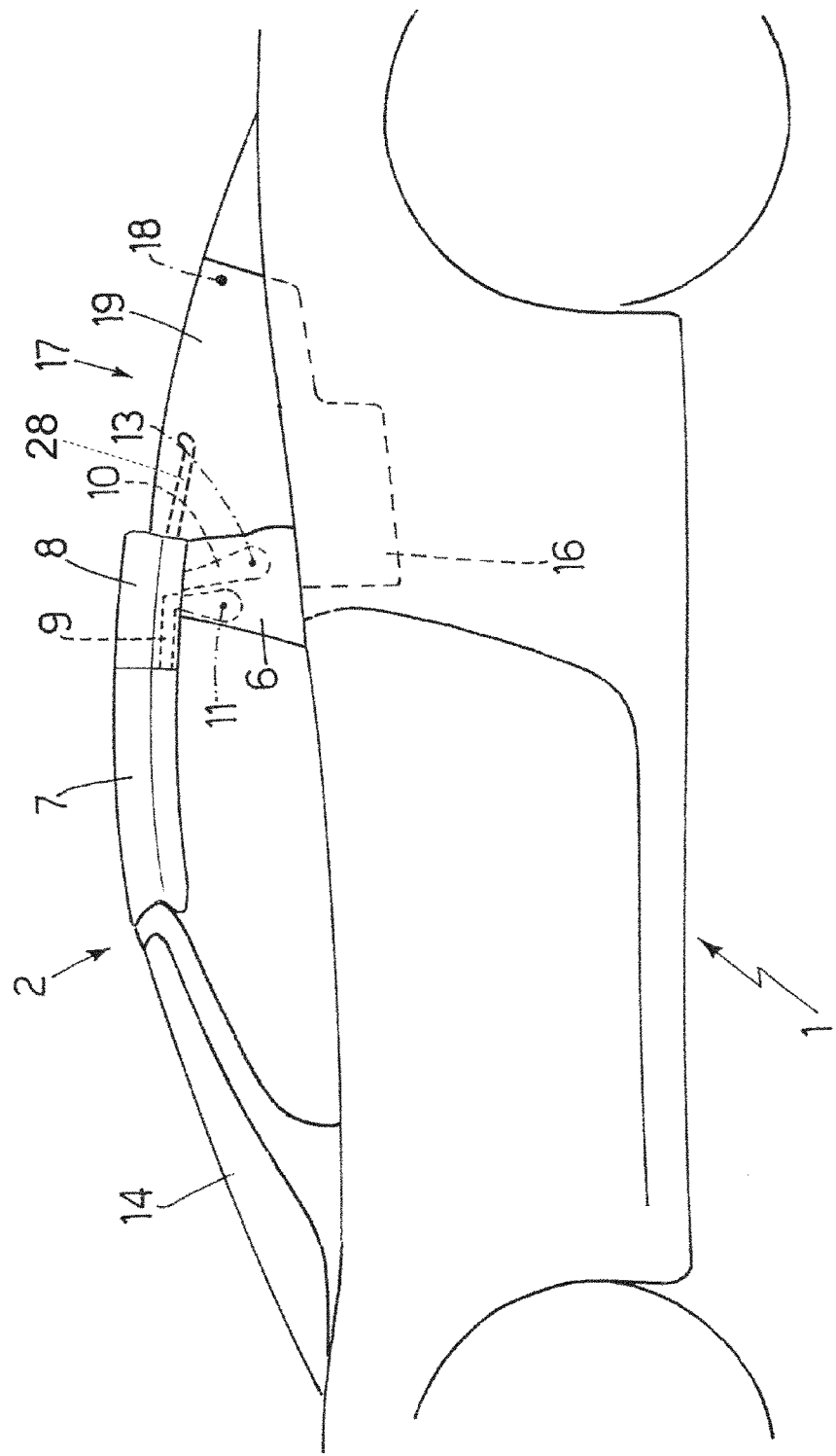
FIGS. 3-7 are a series of diagrammatic side views of the car in FIG. 1, during the subsequent steps of opening the sun roof.

It is worth noting that the two roof members 7 and 8 are not directly mechanically connected but simply lean against each other when the sun roof 5 is set in the closed position (FIGS. 1 and 3).

In FIGS. 3-7, it is apparent that the roof members 7 and 8 perform an approximately 180° rotation about the rotation axes 11 and 13 with respect to the posts 6 of frame 4, in order to move the sun roof 5 from the closed position to the open position, and vice versa.

When the sun roof 5 is set in the open position (FIG. 7), the roof members 7 and 8 are arranged within a housing 16, which is obtained above the engine compartment 3 immediately next to posts 6 and rear window 15, and is closed by a cover 17 hinged at the back to rotate about a horizontal rotation axis 18 parallel to the rotation axes 11 and 13. According to a preferred embodiment, the operation of opening/closing cover 17 is controlled by a servo actuator (not shown) of the electric or hydraulic type. Cover 17 may be hinged to frame 4 by means of simple hinges, or alternatively cover 17 may be connected to frame 4 by means of a pair of articulated quadrilaterals to perform a rototransiation with respect to the frame 4 itself.

Preferably, cover 17 has a pair of fins 19, which are arranged on opposite sides of the cover 17, and which lean, when cover 17 is closed, against the external vertical posts 6 when cover 17 is in a closed position of the housing 16.

In housing 16, the two roof members 7 and 8 are arranged substantially horizontally one over the other; in other words, the roof members 7 and 8 are vertically packed over each other in the housing 16, and in particular roof member 7 is arranged over roof member 8 in the housing 16.

Figure 4:
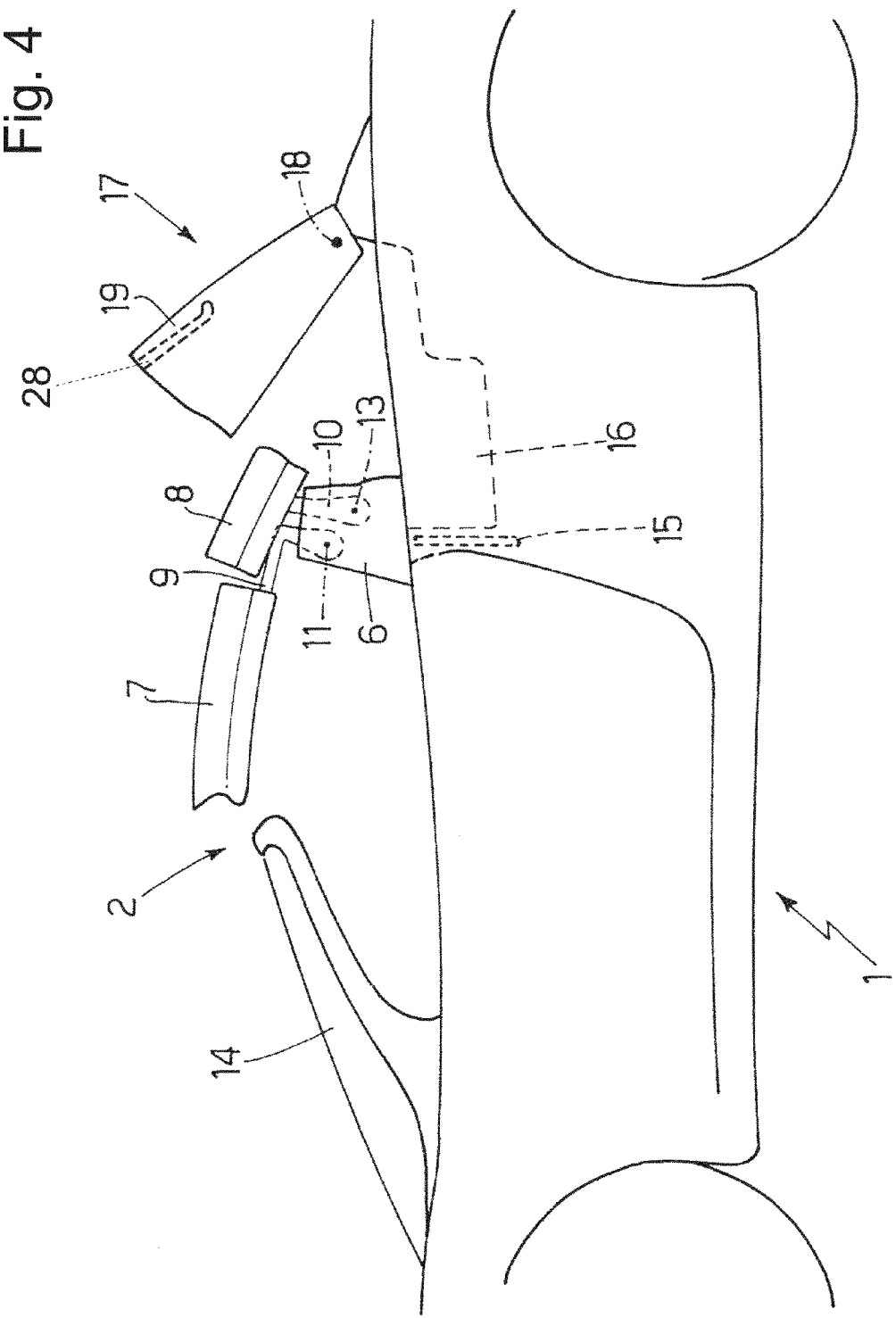
Figure 5:
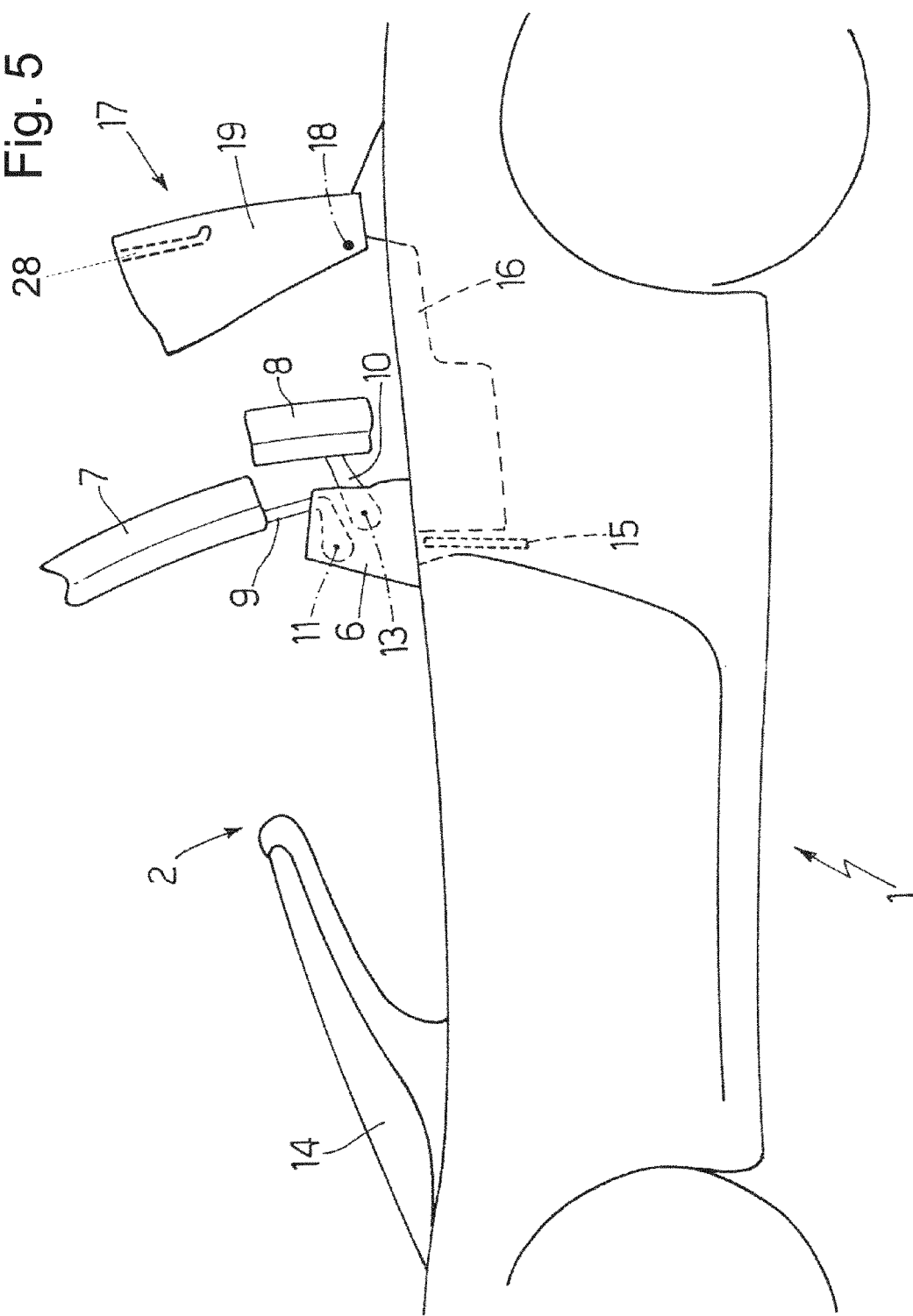
Figure 6:
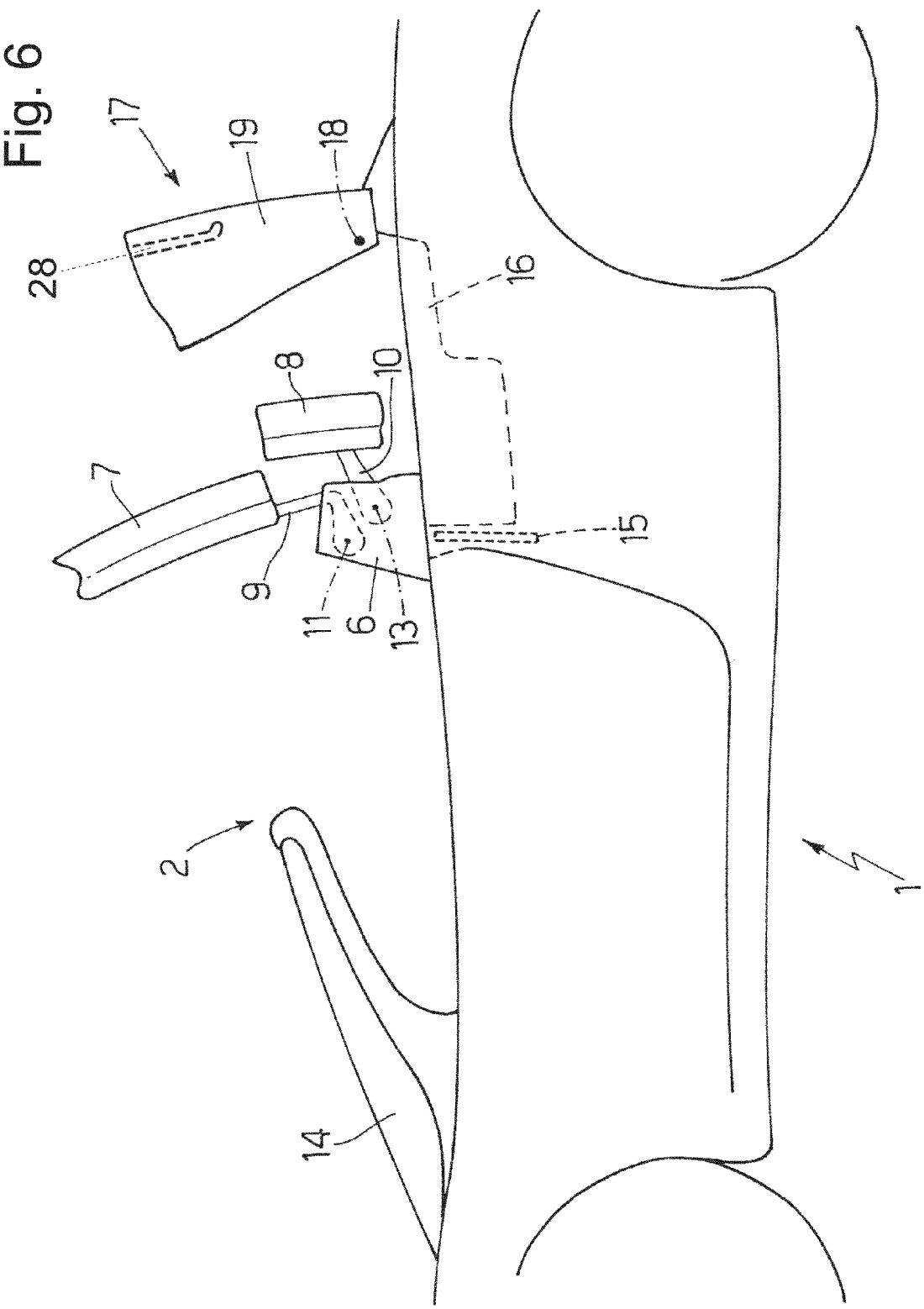
Figure 7:
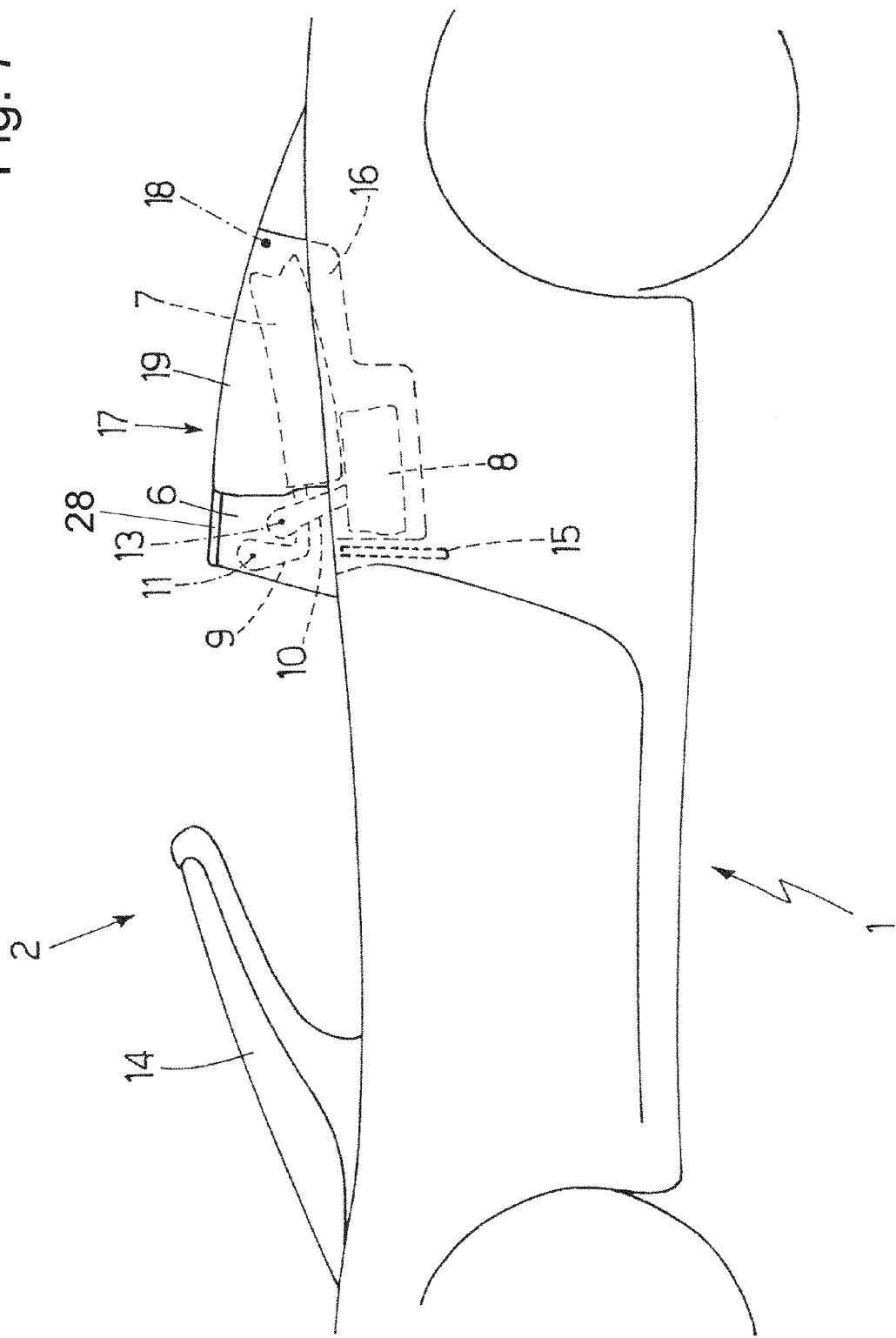

In order to take the sun roof 5 from the closed position (FIGS. 1 and 3) to the open position (FIG. 7) and vice versa, the actuator device 12 rotates the roof member 7 about the rotation axis 11 and rotates the roof member 8 independently from the roof member 7 about the rotation axis 13, as shown in FIGS. 4, 5 and 6. The rotation of the two roof members 7 and 8 is simultaneous, i.e. the two roof members 7 and 8 are rotated by the actuator device 12 at the same time; obviously, for obvious reasons of mechanical interference, the rotation of roof member 8 must always slightly precede the rotation of roof member 7 when opening the sun roof 5, and vice versa when closing the sun roof 5.

Figure 12:
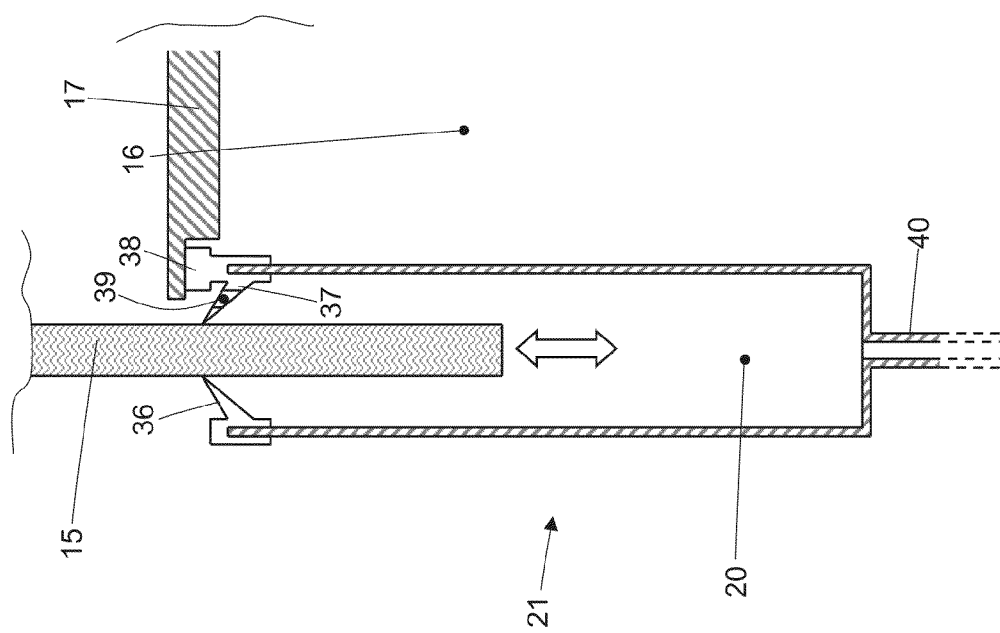
FIG. 12 is a diagrammatic cross-section view of a support structure of a rear window of the car in FIG. 1.

In order to allow the above-described actuation of the roof members 7 and 8 from and to the housing 16, the rear window 15 is movable parallely to itself along a substantially vertical direction between an extracted position (shown in FIGS. 1 and 3), in which the rear window 15 projects from the car body, and a withdrawn position (shown in FIGS. 4-7), in which the rear window 15 is housed inside the car body in a respective containing tank 20 (diagrammatically shown in FIG. 12), which is obtained in a support structure 21 of the rear window 15 (shown in FIG. 2 and in FIG. 12), arranged between the housing 16 of the roof members 7 and 8 and the passenger compartment 2. In use, the rear window 15 is arranged in the withdrawn position to set the sun roof 5 from the closed position to the open position and to set the sun roof 5 from the open position to the closed position, so as to avoid, any interference with the rotational movement of the roof members 7 and 8.

According to a preferred embodiment shown in FIG. 2, the rear window 15 comprises a transparent flat panel, which is arranged substantially vertical (or with an appropriate inclination to avoid annoying reflections from being generated on the rear-view mirror inside car 1) and is supported by a metal frame slidingly mounted on respective guides to move parallely to itself between the extracted position, in which the rear window 15 projects from the car body, and the withdrawn position, in which the rear window 15 is housed inside the car body in the containing tank 20.

When the sun roof 5 is set in the closed position, the rear window 15 is generally arranged in the extracted position; however, the driver could decide to set the rear window 15 in the withdrawn position to increase ventilation in the passenger compartment 2. When the sun roof 5 is set in the open position, the rear window 15 is generally arranged in the withdrawn position; however, the driver could decide to set the rear window 15 in the extracted position to use the rear window 15 as windbreaker and therefore reduce turbulence inside the passenger compartment 2.

Figure 8:
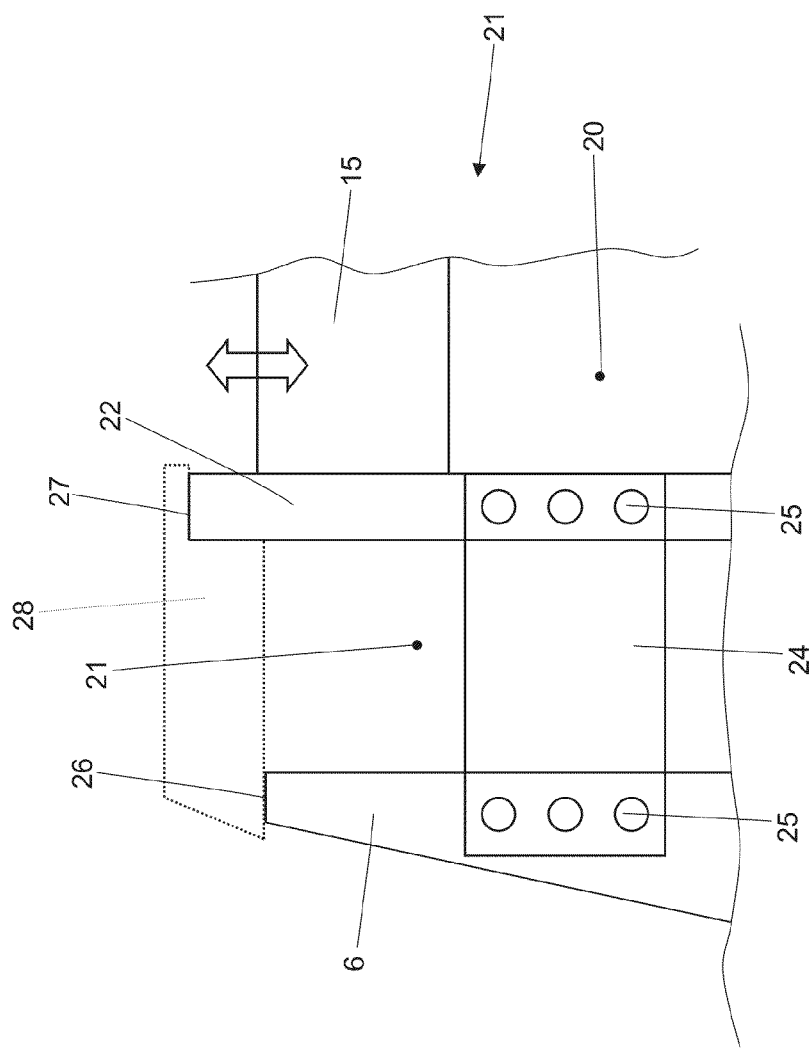
FIG. 8 is a diagrammatic rear view of a detail of an internal post and of an external post of the frame of the car in FIG. 1.
Figure 10:
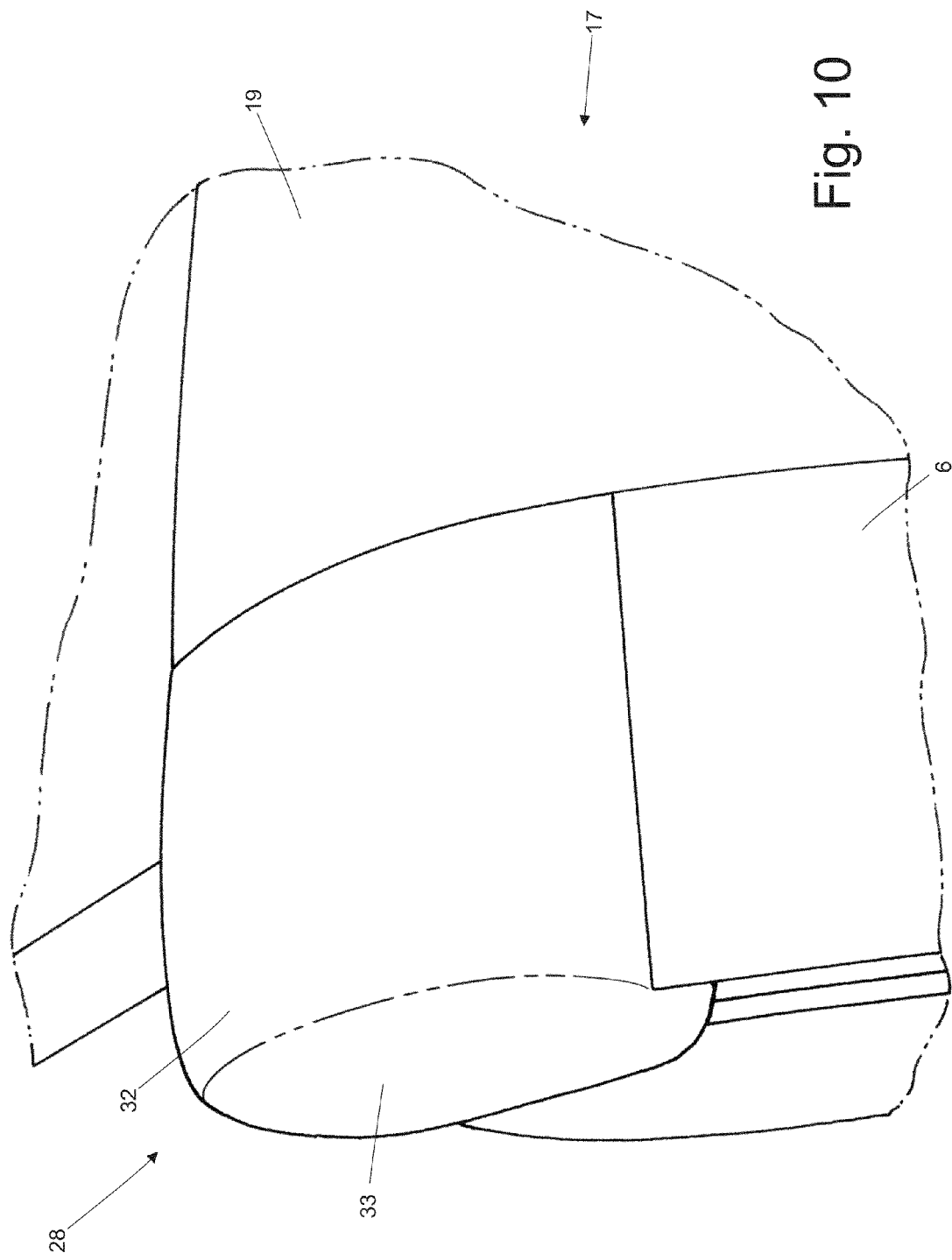
FIG. 10 is a diagrammatic perspective view of the closing body of FIG. 8 leaning against a vertical post of the car frame.

The support structure 21 of the rear window 15 is supported by two internal vertical posts 22 of frame 4 which are the lateral walls of the support structure 21 itself (in other words, the support structure 21 is built on the two internal vertical posts 22 which laterally delimit the support structure 21). As shown in FIGS. 2, 8 and 10, the two internal vertical posts 22 are arranged between the external vertical posts 6 and at a given distance from the external vertical posts 6, so that a hollow space 23, i.e. a technical space intended to accommodate functional parts of the sun roof 5, is defined between each external vertical post 6 and the corresponding internal, vertical post 22 (i.e. the internal vertical post 22 arranged close to the external vertical post 6).

When cover 17 is in a closed position of the housing 16, each fin 19 of cover 17 leans against an external side of an external vertical post 6 of frame 4 and against an internal side of an internal vertical post 22 of frame 4.

All the above-described movements are preferably carried out with the aid of the actuator device 12 which determines the movement of the roof members 7 and 8, with the aid of an actuator device (not shown) to determine the movement of the rear window 15, and with the aid of an actuator device (not shown) to determine the movement of cover 17 of the housing 16; such actuators are preferably of the electric type but may also be of the pneumatic or hydraulic type. According to a different embodiment, it may be chosen to have some or all of the above-described movements carried out manually by the driver of car 1; such a choice obviously results in more inconvenience for the driver, but on the other hand allows to contain costs and especially the dimensions and weight of the sun roof 5.

According to a different embodiment (not shown), roof member 7 is supported by roof member 8, and not by frame 4, so as to move with respect to roof member 8 between an extended position, in which roof member 7 is coplanar with roof member 8, and a folded position, in which roof member 7 is packed over or under roof member 8. Roof member 7 may be mechanically connected to roof member 8 so as to move with respect to the roof member 8 itself between the folded position and the extended position, either by means of a translation, a rotation, or a rototransiation. When the sun roof 5 goes from the closed position to the open position, roof member 7 is folded either under or over roof member 8 by means of either a translation, a rotation, or a rototranslation with respect to roof member 8, and not by means of a rotation about the rotation axis 11 as described above. Roof member 8 is then rotated about the rotation axis 13 to be inserted, together with roof member 7, into the housing 16, as described above.

According to a further embodiment (not shown), roof member 8 is supported by roof member 7, and not by frame 4, so as to move with respect to roof member 7 between an extended position, in which roof member 8 is coplanar with roof member 7, and a folded position, in which roof member 8 is packed either over or under roof member 7. Roof member 8 may be mechanically connected to roof member 7 so as to move with respect to the member 7 itself between the folded position and the extended position by means of either a translation, a rotation, or a rototranslation. When the sun roof 5 goes from the closed position to the open position, roof member 8 is folded either under or over roof member 7 by means of either a translation, a rotation, or a rototransiation with respect to roof member 7, and not by means of a rotation about the rotation axis 13, as described above. Roof member 7 is then rotated about the rotation axis 11 to be inserted, together with roof member 8, into the housing 16, as described above.

According to a preferred embodiment, the support members of roof members 7 and 8 are arranged in the two hollow spaces (therefore, in the embodiment shown in the accompanying figures, the connection arms 9 and 10 are arranged in the two hollow spaces 23). In particular, the support members of roof members 7 and 8 are mechanically connected to a structure consisting of the external vertical posts 6 and the internal vertical posts 22. As shown in FIG. 8, each pair of vertical posts 86 and 22 (i.e. each pair consisting of an external, vertical post 6 and the corresponding internal vertical post 22) comprises a structural connection 24, which is vertically arranged and connected at its ends to the two vertical posts 6 and 22 (for example, but not necessarily, by means of screws 25). Each structural connection 24 has both the structural function of stiffening this zone of frame 4 (in other words, by virtue of the structural connection 24, the corresponding vertical posts 6 and 22 form a single structure), and the function of providing an anchoring point for the support members of the roof members 7 and 8 (in other words, the support members of the roof members 7 and 8 are hinged to the structural connections 24).

As shown in FIGS. 1 and 3, when the sun roof 5 is in the closed position, the rear roof member 8 covers the hollow spaces 23 on the top and leans against an upper wall 26 of each external vertical post 6 of frame 4 and against an upper wall 27 of each internal vertical post 22 of frame 4.

As shown in FIG. 8, the external vertical posts 6 and the internal vertical posts 22 together also act as roll-bar if car 1 rolls over. In particular, the internal vertical posts 22 are higher than the external vertical posts 6 (i.e. the upper walls 27 of the internal posts 22 are arranged higher than the upper walls 26 of the external vertical posts 6); thereby, if car 1 rolls over, the external vertical posts 6 primarily serve the function of transversal roll-bar (i.e. laterally protect the occupants of the passenger compartment 2). and the internal vertical posts 22 primarily serve the function of vertical roll-bar (i.e. protect the occupants of the passenger compartment 2 from the top). With this regard, it is worth emphasizing the importance of the structural connections 24, which allow to stiffen both the vertical posts 6 and 22, by connecting the vertical posts 6 and 22 to each other, and thus allow to increase both side protection (essentially ensured by the external vertical posts 6) and upper protection (essentially ensured by the internal vertical posts 22).

By virtue of the external vertical posts 6 being arranged more outside the seats, the structure consisting of the vertical posts 6 and 22 ensures a better protection in the initial steps of a roll-over with respect to the commonly adopted solutions, in which the roll-bars are normally positioned in axis with the seats.

The presence of higher internal vertical posts 22, which ensure upper protection of the occupants of the passenger compartment 2, allows to make the external vertical posts 6 shorter; such a feature is very useful because it allows to provide a body of car 1 which is particularly beautiful (as mentioned above, the pleasant appearance is of the utmost importance in a car with sun roof because these types of car are essentially chosen for their appearance).

As shown in FIGS. 7-9 and 10, the sun roof 5 comprises two closing bodies 28, each of which is mounted so as to be movable between an operating position (shown in FIGS. 7 and 10), in which the closing body 28 is arranged over a corresponding hollow space 23 and leans against the upper wall 26 of an external vertical post 6 of frame 4 and against the upper wall 27 of an internal vertical post 22 of frame 4, and a rest position (shown in FIGS. 3-6), which is different from the operating position (i.e. in the rest position, the closing body 28 is not arranged over a corresponding hollow space 23 and does not lean against the upper wall 26 of an external vertical post 6 of frame 4, nor against the upper wall 27 of an internal vertical post 22 of frame 4).

An actuation mechanism is included, which is mechanically coupled to the closing bodies 22, so as to move the two closing bodies 22 to the operating position when the sun roof 5 is in the open position, and so as to move the two closing bodies 22 to the rest position when the sun roof 5 is in the closed position. According to a preferred embodiment, the actuation mechanism of the two closing bodies 22 comprises a mechanical connection between the support members of the roof members 7 and 8 and the closing bodies 22, so that the movement of the roof members 7 and 8 also determines the corresponding movement of the closing bodies 22 (i.e. a separate actuator is not included for the two closing bodies 22, but the movement of the roof members 7 and 8 is used to move the closing bodies 22). The actuation mechanism of she closing bodies 22 comprises a Bowden cable 29 (diagrammatically shown in FIG. 9), which mechanically connects each closing body 28 so a corresponding support member of the roof members 7 and 8. Furthermore, the actuation mechanism of the closing bodies 22 comprises, for each closing body 28, an elastic element 30 (in particular a spring), which biases the closing body 28 itself towards an operating position; each mechanical connection (i.e. each Bowden cable 29) moves the corresponding closing body 28 from the operating position to the rest position against the bias of the elastic element 30.

Figure 9:
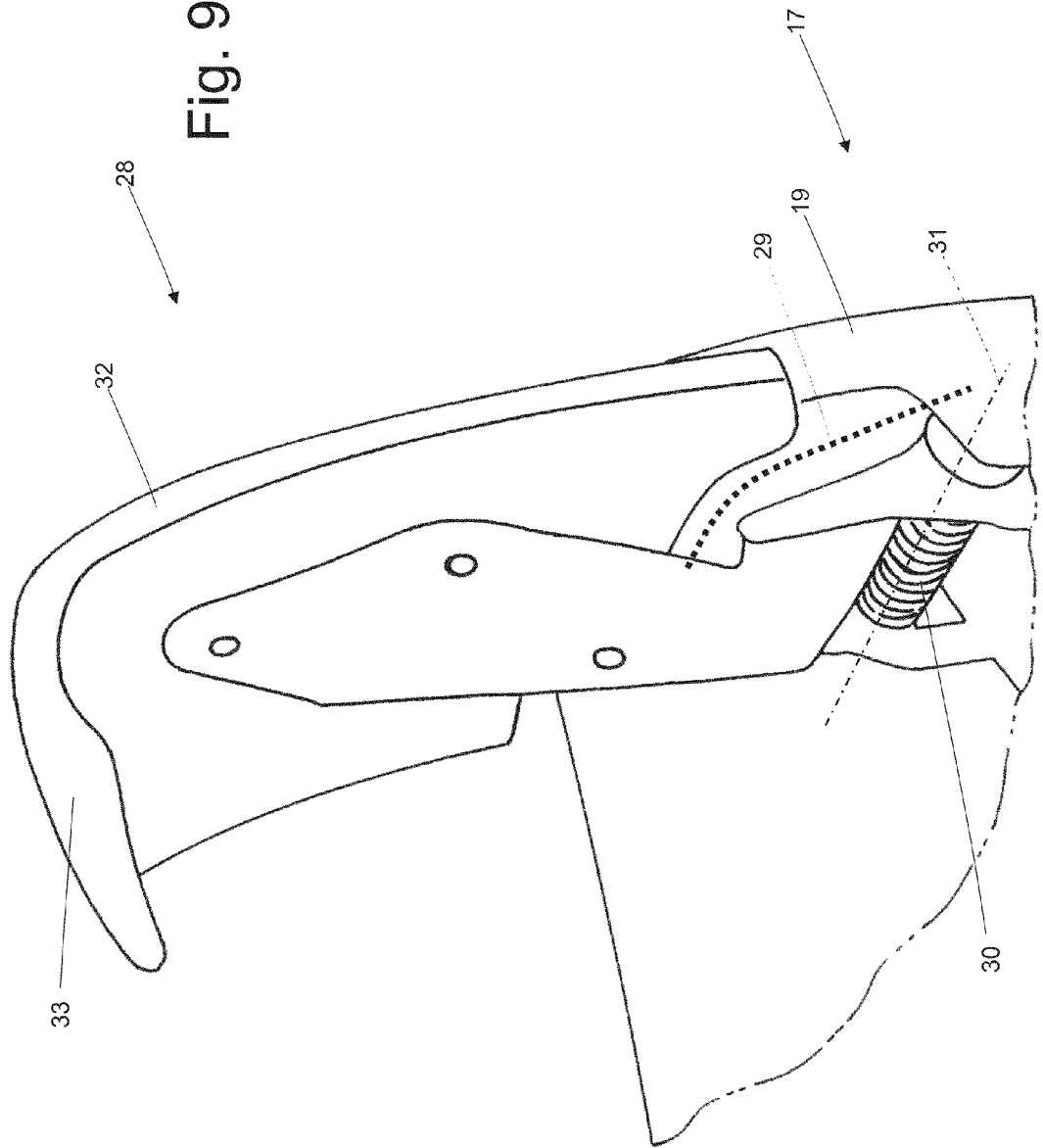
FIG. 9 is a diagrammatic perspective view of a closing body connected to a cover of a housing of roof members of the sun roof of the car in FIG. 1.

As shown in FIG. 9, the two closing bodies 22 are supported by the cover 17 of the housing 16 of the sun roof 5, and in particular each closing body 28 is arranged at the top of a fin 19 of cover 17. In the operating position, each closing body 28 longitudinally projects so as to protrude from the movable cover 17 (as shown in FIGS. 2, 7, 9 and 10), and in the rest position each closing body 28 is arranged under the movable cover 17 (as show in FIGS. 3-6). As shown in FIG. 9, each closing body 28 is hinged to the movable cover 17 to rotate about a rotation axis 31 through an approximately 180° rotation between the operating position and the rest position.

As shown in FIGS. 9 and 10, each closing body 28 is "L"-shaped and has an upper wall 32 which, in the operating position, is arranged over a corresponding hollow space 23 and leans against the upper wall 26 of an external vertical post 6 of frame 4 and against the upper wall 27 of an internal vertical post 22 of frame 4, and a front wall 33 which, in the operating position, is arranged in front of the hollow space 32 and leans against a front edge 34 (shown in FIG. 11) of an external vertical post 6 of frame 4 and against a front edge 35 (shown in FIG. 11) of an internal vertical post 22 of frame 4.

According to a different embodiment (not shown), the two closing bodies 22 are directly supported by frame 4, and in the rest position each closing body 28 is arranged within the corresponding hollow space 23.

According to a preferred embodiment (shown in FIG. 12), the containing tank 20 of the support structure 21 of the rear window 15 is provided with an internal sealing gasket 36, which is arranged inside the passenger compartment 2 and internally establishes a seal between the rear window 15 and the containing tank 20, and with an external sealing gasket 37, which is arranged outside the passenger compartment 2 and externally establishes a seal between the rear window 15 and the containing tank 20. According to a preferred embodiment, the external sealing gasket 37 has a leg 38 which establishes a seal between cover 17 and housing 16 (i.e. an edge of cover 17 leans against the upper leg 38 of the external sealing gasket 37 to seal housing 16). According to a preferred embodiment, the external sealing gasket 37 has through drain holes 39, which establish a direct communication between the zone arranged immediately behind the rear window 15 and the interior of the containing tank 20; in particular, the external sealing gasket 37 of the containing tank 20 of the rear window 15 has at least two through drain holes 39, which are positioned on the right and left sides of the horizontal segment of the external seal 37 itself.

A drain channel 40, which ends with a lower outlet opening obtained through a lower floor of car 1 and serves the function of evacuating the water which penetrates in the containing tank 20, originates from a bottom wall of the containing tank 20. The function of the drain holes 39 is to allow to drain the water which is in the zone immediately behind the rear window 15, and thus prevent an accumulation of water in this zone (particularly when car 1 is downhill) which could even enter into the passenger compartment 2 if the rear window 15 is all lowered (even unintentionally).

Figure 13:
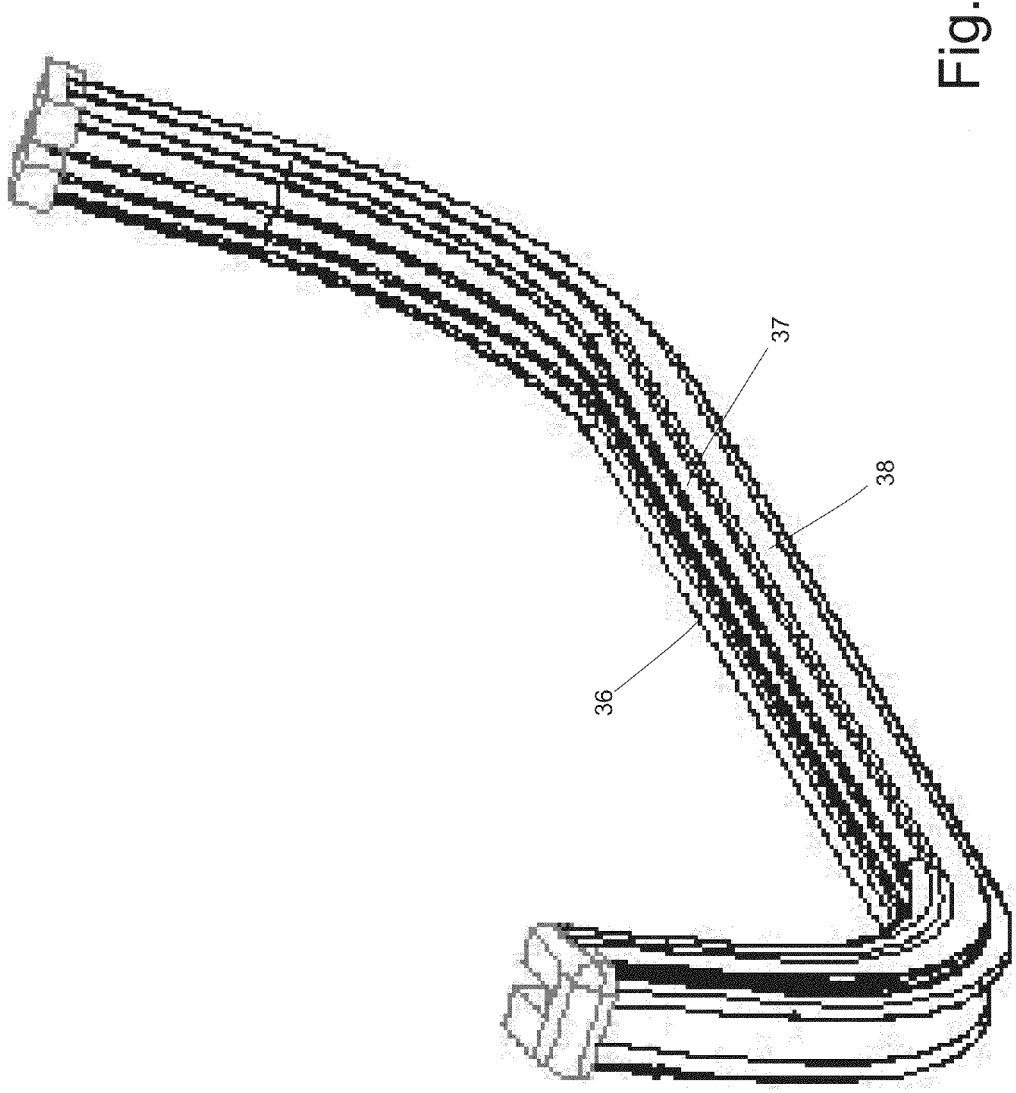
FIGS. 13-17 are some diagrammatic perspective views of gaskets of some parts of the sun roof of the car in FIG. 1.

As shown in FIG. 13, gaskets 36 and 37 of the rear window 15 are "U"-shaped (the drain holes 39 are obviously present only in the lower horizontal part of the external casket 37 of the rear window 15). In particular, gaskets 36 and 37 of the rear window 15 (which are a single monolithic body) have a lower horizontal, part which is arranged at the edge of the containing tank 20, and two vertical upper parts which are arranged on opposite sides of the horizontal lower part and are connected to the two internal vertical posts 22. Thereby, the edge of cover 17 between the tops of the two fins 19 leans against the leg 38 of the external gasket 37 of the rear window 15 to provide the sealing action (obviously when cover 17 is in the closing position). Gaskets 36 and 37 of the rear window 15, once assembled, are a single monolithic body, which ensures the sealing action on the three sides of the rear window 15.

Figure 11:
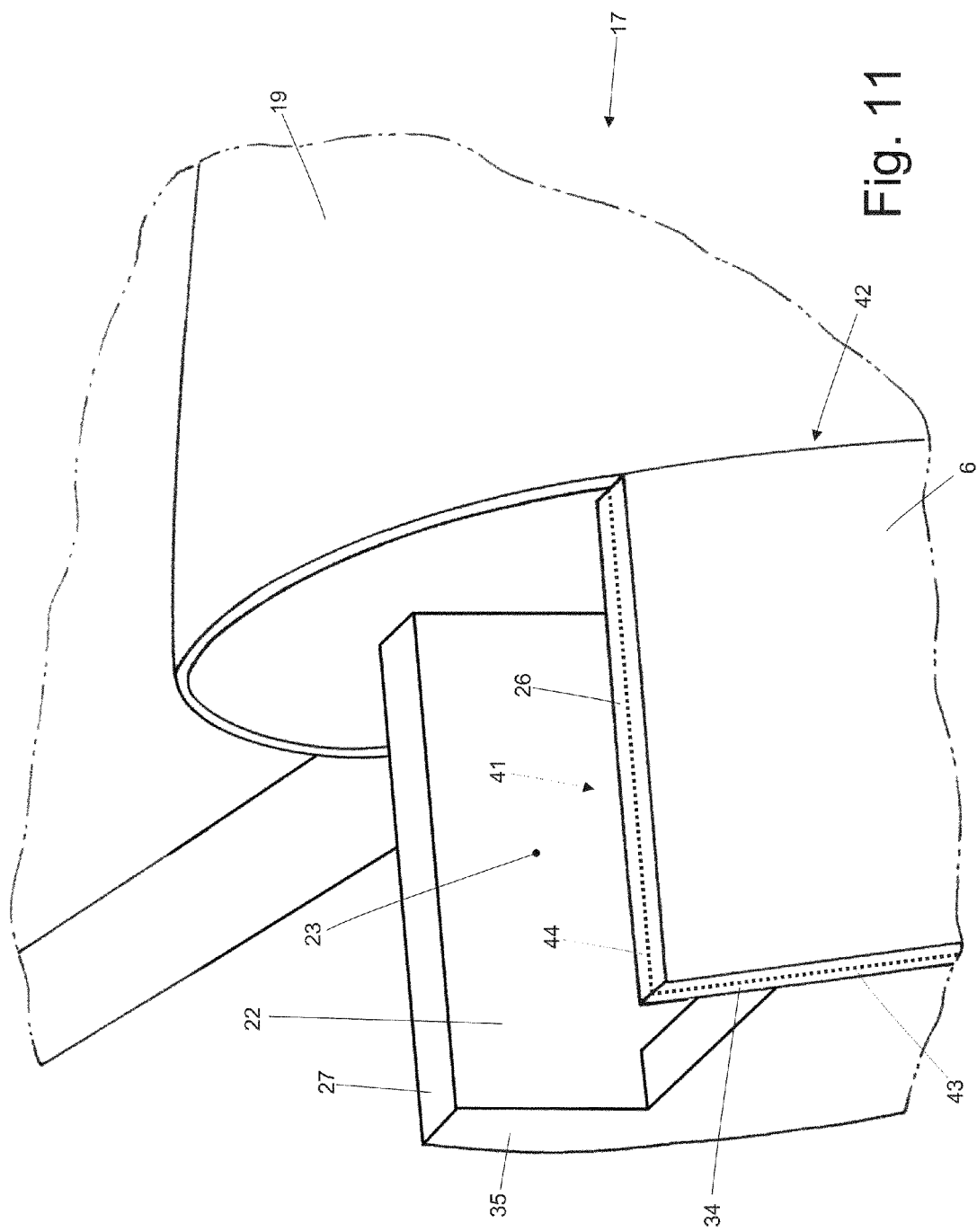
FIG. 11 is a diagrammatic perspective view of the vertical post in FIG. 9 without the presence of the closing body in FIG. 8.
Figure 14:
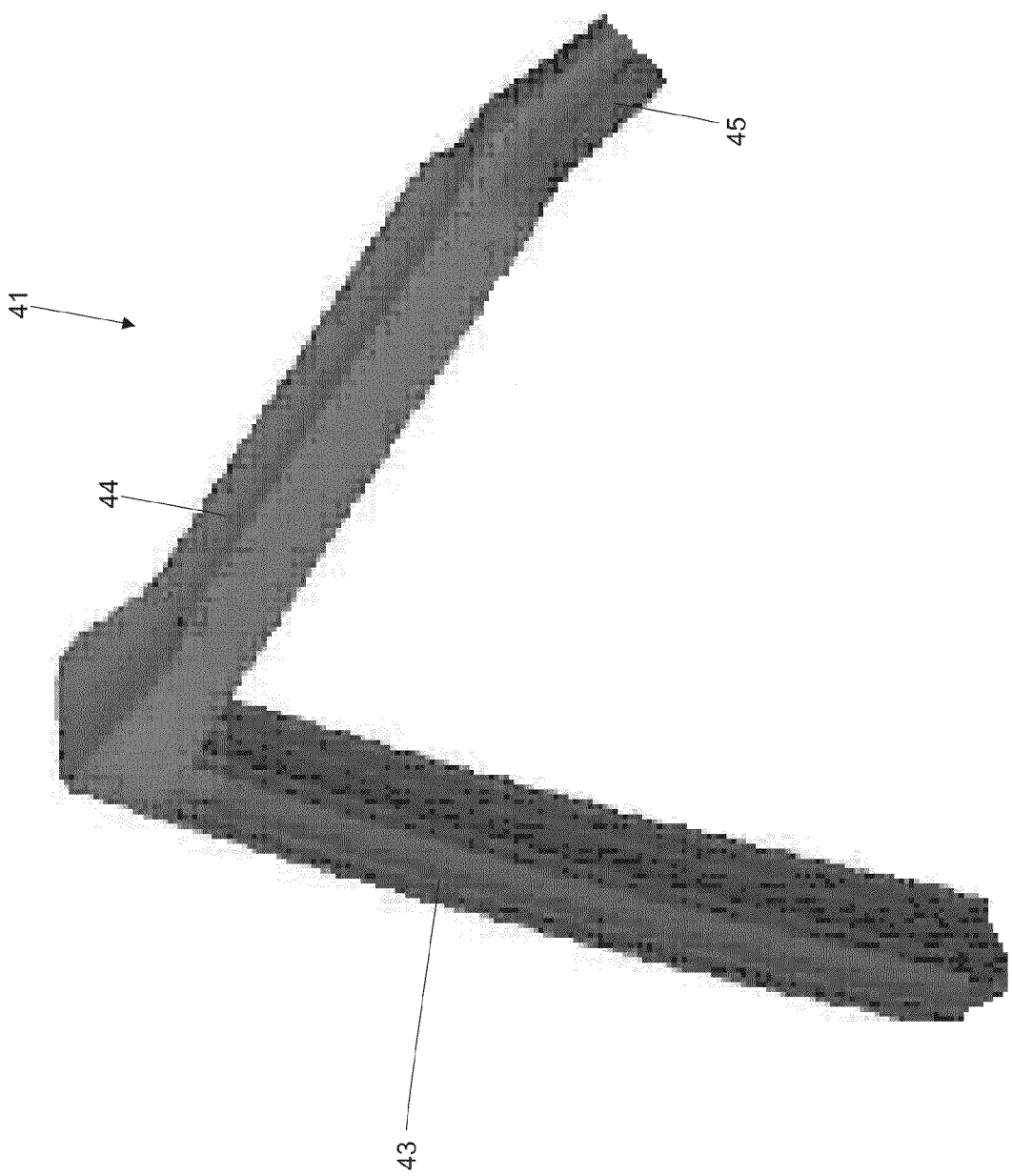

As shown in FIG. 11, each external vertical post 6 is provided with a "U"-shaped sealing gasket 41 (shown in greater detail in FIG. 14), which seamlessly covers the external periphery of the external vertical post 6 itself, i.e. (completely) covers the front edge 34 of the external vertical post 6, (completely) covers the upper wall 26 of the external vertical post 6, and (partially) covers a rear edge 42 of the external vertical post 6. A front part 43 of each sealing gasket 41 which covers the front edge 34 of the external vertical post 6 establishes a seal together with a window of the door, an upper part 44 of each sealing gasket 41 which covers the upper wall 26 of the external vertical post 6 establishes a seal together with the rear roof member 8 of the sun roof 5, and a rear part 45 of each sealing gasket 41 which covers the rear edge 42 of the external, vertical post 6 establishes a seal together with fin 19 of cover 17.

Figure 15:
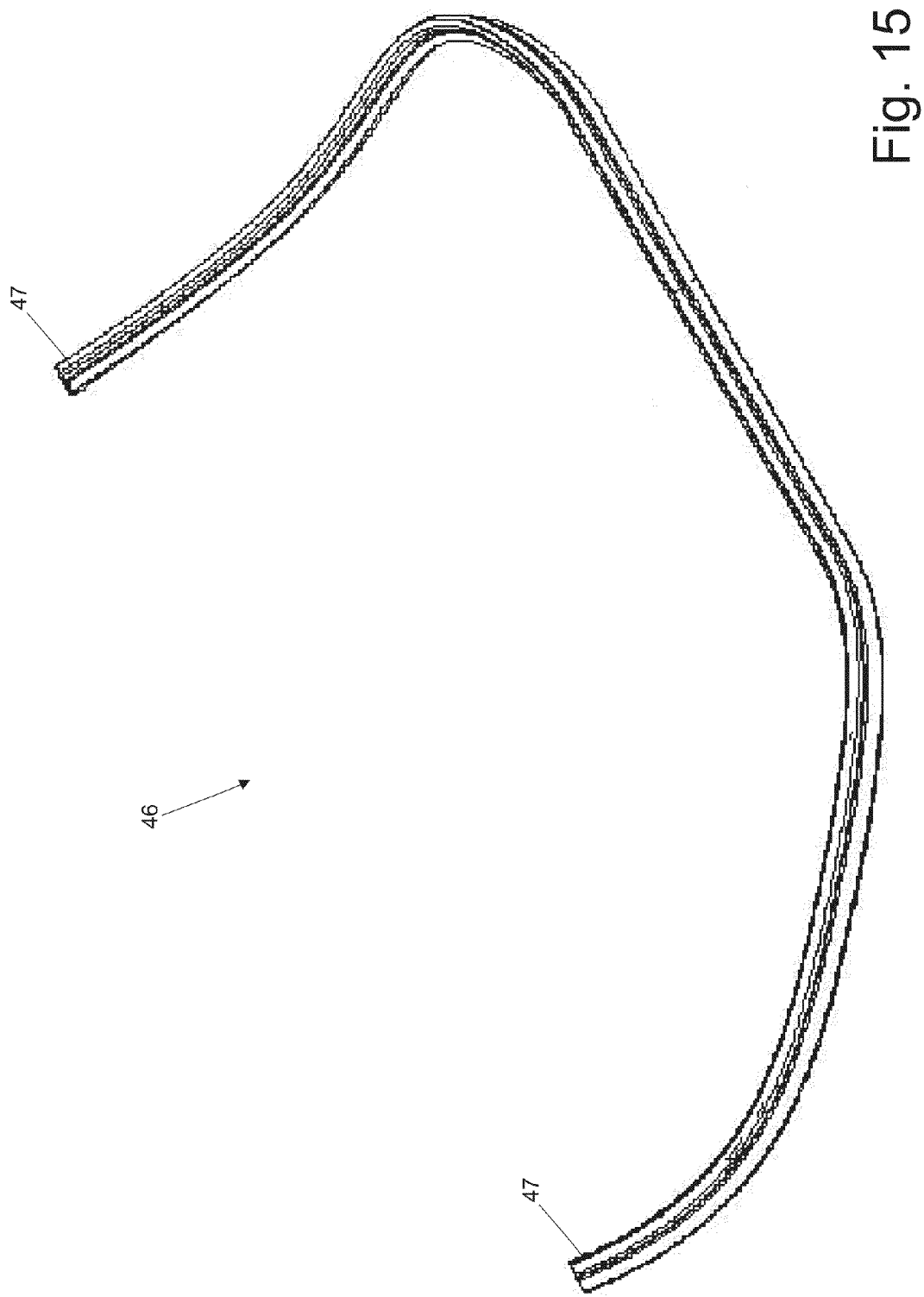
Figure 16:
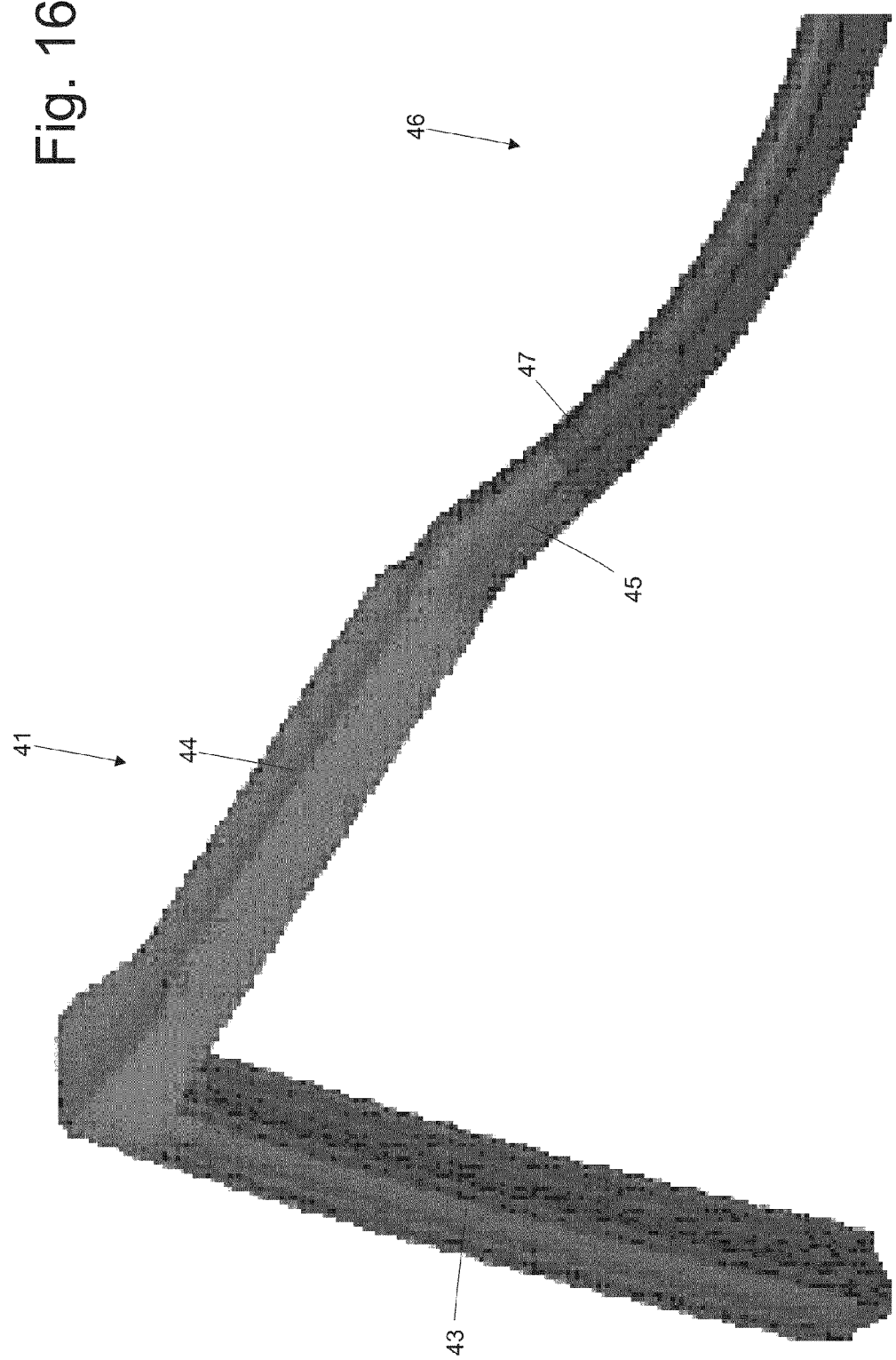

As shown in FIG. 15, the cover 17 of housing 16 is provided with a single sealing gasket 46 which is "U"-shaped and ends at the fins 19 with two ends 47 (i.e. the cover 17 of housing 16 presses on three sides of the single sealing gasket 46). As shown in FIG. 16, each end 47 of the sealing gasket 46 of cover 17 leans against the rear edge 42 of a corresponding external vertical post 6 so as to cover the portion of rear edge 42 left free by the corresponding sealing gasket 41 of the external vertical post 6 itself. In other words, as shown in FIG. 16, the rear part 45 of the sealing gasket 41 of each external vertical post 6 and the corresponding end 47 of the sealing gasket 46 of cover 1 are reciprocally complementary in order to cover together, without overlapping, the rear edge 42 of a corresponding vertical post 6 (i.e. the end 47 of the sealing gasket 46 starts where the rear part 45 of the sealing gasket 41 ends).

Figure 17:
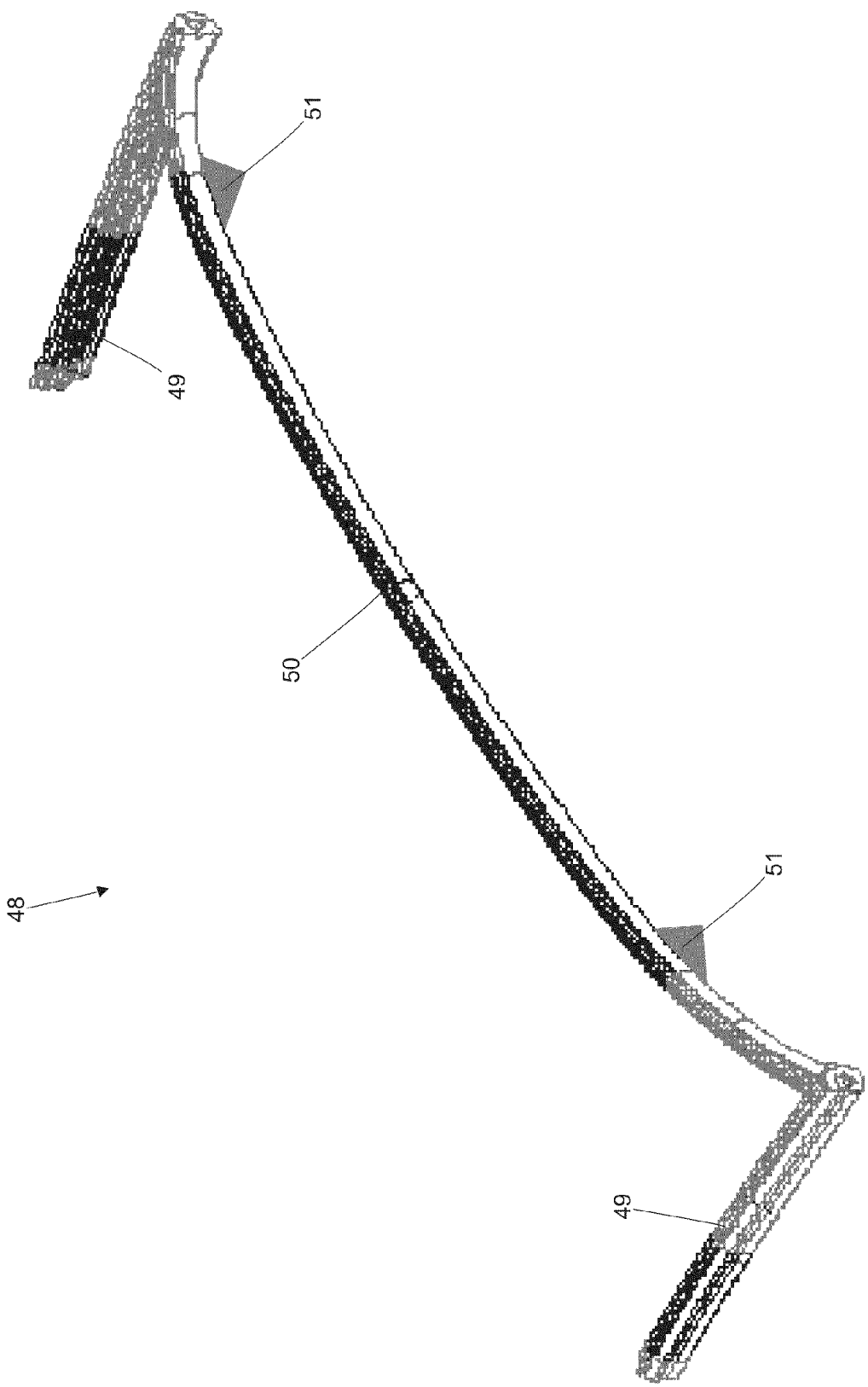

As shown in FIG. 17, the rear roof member 8 is provided with a single sealing gasket 48, which is "U"-shaped and has two lateral parts 49, which are arranged longitudinally, and a central part 50, which is arranged transversally. When roof 5 is in the closed position, each side part 49 of the sealing gasket 48 of the rear roof member 8 leans against the upper part 44 of the sealing gasket 41 of the corresponding external vertical post 6, so that the connection between the side part 49 of the sealing gasket 48 and the upper part 44 of the sealing gasket 41 forms an impenetrable barrier. Furthermore, when roof 5 is in the closed position, the opposite ends of the central part 50 of the sealing gasket 48 of the rear roof member 8 lean against the front edge of the cover 17 of housing 16 (and in particular against the top of the two fins 19 of cover 17), so as to establish a seal together with cover 17. Finally, when roof 5 is in the closed position, the central part 50 of the sealing gasket 48 leans against the top of the two ends of the seals 36 and 37 of the rear window 15 (i.e. the two ends of the gaskets 36 and 37 abut against the central part 50 of the sealing gasket 48); in order to improve the sealing action with the two ends of the gaskets 36 and 37 of the rear window 15, the central part 50 of the sealing gasket 48 has two legs 51 which project so as to protrude downwards from the central part 50. In other words, the central part 50 of the sealing gasket 48 establishes a connection between the gaskets 36 and 37 of the rear window 15 and the rear parts 45 of the sealing gaskets 41, thus allowing a continuous seal to be obtained against the front edge of the cover 17 of housing 16.

Figure 18:
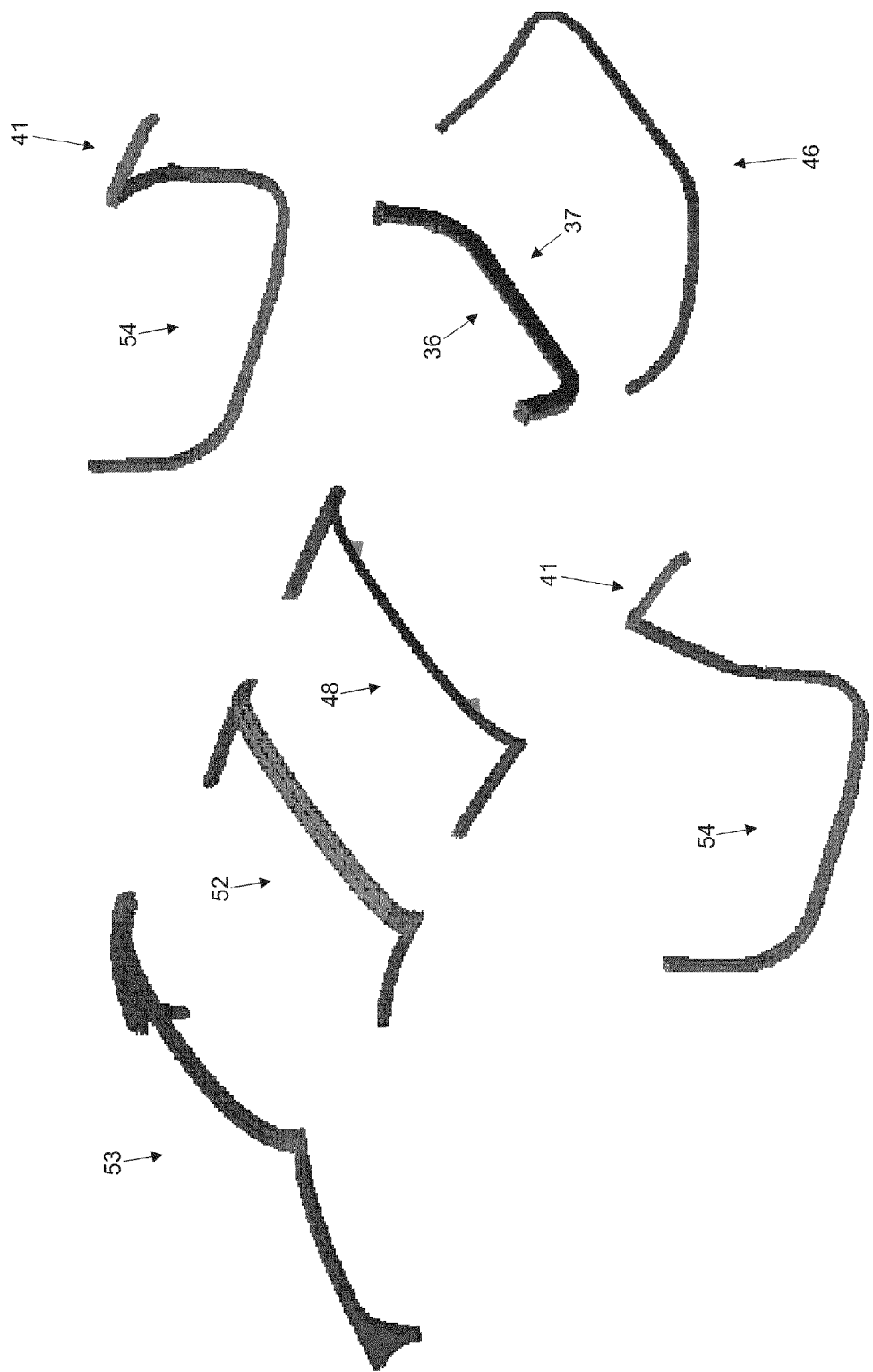
FIG. 18 is an diagrammatic, exploded perspective view of all the gaskets of the car in FIG. 1.

FIG. 18 diagrammatically shows all the gaskets of car 1; in addition to the above-described gaskets 36, 37, 41, 46 and 48, the figure also shows a sealing gasket 52 of the roof member 7, a sealing gasket 53 of the windscreen, and the two sealing gaskets 54 of the doors.

The above-described sealing gasket set is simple to be implemented and assembled, is particularly effective when ensuring total fluid-tightness in the passenger compartment 2 and in the housing 16. Furthermore, the above-described sealing gasket set has the further advantage of being not very "visible" (and thus of being "beautiful") when roof 5 is in the open position (as mentioned above, pleasant appearance is of the utmost importance in a car with sun roof because this types of cars are essentially chosen for their appearance).

The above-described sun roof 5 has many advantages, because it is simple and cost-effective to be implemented, and in the folded position has extremely reduced dimensions, perfectly compatible with the features of a car 1 with a central or rear engine. Moreover, in all configurations of the sun roof 5, full accessibility and usability of the rear zone of the passenger compartment 2 located behind the seats and generally used for stowing hand baggage is also ensured. Finally, the rear window 15 is made of glass, with apparent benefits in terms of visibility and acoustic insulation, allows a defrosting and/or demisting device with electrically heated filaments to be installed, and is able to perform wind-breaking functions when the sun roof 5 is set in the open position.

By virtue of its extremely small dimensions when in the folded position, the above-described, sun roof 5 is particularly suited to be used in a car 1 with a central or rear engine of the type shown in the accompanying figures; however, in the light of the several advantages displayed by the above-described sun roof 5, the sun roof 5 itself may also be advantageously used in a car with a front engine.

Furthermore, by virtue of the presence of the closing bodies 22, adequately sealing the contact zone between the upper walls 26 of the two external vertical posts 6 and the rear roof member 8 is not a problem, while keeping a pleasant appearance when roof 5 is in the open position (as mentioned above, a pleasant appearance is of the utmost importance in a car with sun roof because these types of cars are chosen essentially for their appearance). Indeed, when roof 5 is in the open position, the upper walls 26 are completely covered by the closing bodies 22 which conceal all the imperfections (including the hollow spaces 23 in which the connection members of the roof members 7 and 8 are housed).

The invention claimed is:

1. A car comprising:
   a frame provided with two external vertical posts, which project from the belt line of the car and face each other on opposite sides of the car;
   a passenger compartment;
   a sun roof, which is supported by the frame and can be set to an open position or a closed position with respect to the passenger compartment;
   a housing to house the sun roof when the sun roof is in the open position;
   a movable cover to close the housing; and
   a rear window, which is mounted in a sliding manner so as to move between an extracted position, in which the rear window projects from the car body, and a withdrawn position, in which the rear window is housed inside the car body;
   wherein the sun roof comprises two rigid roof members which, when the sun roof is in the closed position, are substantially horizontal and substantially coplanar to each other so as to be seamlessly positioned one behind the other, and, when the sun roof is in the open position, are packed one on top of the other inside the housing; and
   wherein the roof members are fitted to the frame by means of a pair of support members; which are arranged on opposite sides of the roof members;
   wherein the frame comprises two internal vertical posts, which are arranged between the external vertical posts at a given distance from the external vertical posts themselves, so as to define, between each of the two external vertical posts and the corresponding internal vertical post, a hollow space, in which the support members of the roof members are arranged.

2. The car according to claim 1, wherein the support organs of the roof members are mechanically connected to a structure including the external vertical posts and the internal vertical posts.

3. The car according to claim 2, wherein each external vertical post and internal post pair is reinforced by a structural connection, which is fitted, at its end, to the external vertical post and internal post.

4. The car according to claim 3, wherein each structural connection provides an anchoring point for the support members of the roof members.

5. The car according to claim 1, wherein the external vertical posts and the internal vertical posts act, together, as a roll-bar in the event of roll-over of the car.

6. The car according to claim 5, wherein the internal vertical posts are higher than the external vertical posts, so that the external vertical posts primarily act as a transverse roll-bar and the internal vertical posts primarily act as a vertical roll-bar.

7. The car according to claim 1 and comprising a support structure of the rear window, which is supported by the two internal vertical posts of the frame, which constitute the lateral walls of the support structure.

8. The car according to claim 1, wherein the cover of the housing of the sun roof presents a pair of fins arranged on opposite sides of the cover, each of which, when the cover is closed, leans against one of the two external vertical posts of the frame with its external side and against one of the two internal vertical posts of the frame with its internal side.

9. The car according to claim 1, wherein, when the sun roof is in the closed position, a rear roof member covers the hollow spaces on the upper side and rests, on the external side, on an upper wall of each of the two external vertical posts of the frame and, on the internal side, on an upper wall of each of the two internal vertical posts of the frame.

10. The car according to claim 9 and comprising two closing bodies, each of which is mounted so as to be moveable between an operating position, in which the closing body is arranged on a corresponding hollow space and rests on the upper wall of one of the two external vertical posts of the frame and on the upper wall of one of the two internal vertical posts of the frame, and a rest position, which is different from the operating position.

11. The car according to claim 10 and comprising an actuation mechanism, which is mechanically coupled to the closing bodies, so as to move the two closing bodies to the operating position when the sun roof is in the open position and so as to move the two closing bodies to the rest position when the sun roof is in the closed position.

12. The car according to claim 11, wherein the two closing bodies are directly supported by the frame.

13. The car according to claim 12, wherein the two closing bodies are supported by the cover of the housing of the sun roof.

14. The car according to claim 13, wherein, in the operating position, each closing body longitudinally protrudes from the movable cover and, in the rest position, each closing body is arranged underneath the movable cover.

15. The car according to claim 14, wherein the cover of the housing of the sun roof presents a pair of fins, which are arranged on opposite sides of the cover; each closing body is arranged in correspondence to the top of a fin of the cover.

16. The car according to claim 10, wherein each closing body is "L"-shaped and has an upper wall, which, in the operating position, is arranged on a corresponding hollow space and rests on the upper wall of one of the external vertical post of the frame and on the upper wall of one of the internal vertical post of the frame, and a front wall, which, in the operating position, is arranged in front of the hollow space and leans against a front edge of one of the two external vertical posts of the frame and against a front edge of one of the two internal vertical post of the frame.

17. A car comprising:
   a frame provided with two external vertical posts which project from the belt line of the car and face each other on opposite sides of the car;
   a passenger compartment;
   a sun roof which is supported by the frame and can be set to an open position or a closed position with respect to the passenger compartment;
   a housing to house the sun roof when the sun roof is in the open position;
   a movable cover to close the housing; and
   a rear window which is mounted in a sliding manner so as to move between an extracted position, in which the rear window projects from the car body, and a withdrawn position, in which the rear window is housed inside the car body;
   wherein the sun roof comprises two rigid roof members, which, when the sun roof is in the closed position, are substantially horizontal and substantially coplanar to each other so as to be seamlessly positioned one behind the other, and, when the sun roof is in the open position, are packed one on top of the other inside the housing;
   wherein the roof members are fitted to the frame by means of a pair of support members, which are arranged on opposite sides of the roof members,
   wherein the frame comprises two internal vertical posts which are arranged between the external vertical posts at a given distance from the external vertical posts themselves so as to define between each of the two external vertical posts and the corresponding internal vertical post a hollow space in which the support members of the roof members are arranged, wherein the support members of the roof members are mechanically connected to a structure including the external vertical posts and of the internal vertical posts, wherein each external vertical post and internal post pair is reinforced by a structural connection, which is fitted, at its end, to the external vertical post and internal post themselves, wherein each structural connection provides an anchoring point for the support members of the roof members, wherein the external vertical posts and the internal vertical posts act together as a roll-bar in the event of roll-over of the car, wherein the internal vertical posts are higher than the external vertical posts so that the external vertical posts primarily act as a transverse roll-bar and the internal vertical posts primarily act as a vertical roll-bar; and comprising:
   a support structure of the rear window which is supported by the two internal vertical posts of the frame, which constitute the lateral walls of the support structure,
   wherein the cover of the housing of the sun roof presents a pair of fins arranged on opposite sides of the cover, each of which, when the cover is closed, leans against one of the two external vertical posts of the frame with its external side and against one of the two internal vertical posts of the frame with its internal side,
   wherein, when the sun roof is in the closed position, a rear roof member covers the hollow spaces on the upper side and rests, on the external side, on an upper wall of each of the two external vertical posts of the frame and, on the internal side, on an upper wall of each of the two internal vertical posts of the frame; and comprising:
   two closing bodies, each of which is mounted so as to be moveable between an operating position, in which the closing body is arranged on a corresponding hollow space and rests on the upper wall of one of the two external vertical posts of the frame and on the upper wall of one of the two internal vertical posts of the frame, and a rest position, which is different from the operating position; and comprising:
   an actuation mechanism, which is mechanically coupled to the closing bodies, so as to move the two closing bodies to the operating position when the sun roof is in the open position and so as to move the two closing bodies to the rest position when the sun roof is in the closed position, wherein the two closing bodies are directly supported by the frame, wherein the two closing bodies are supported by the cover of the housing of the sun roof, wherein, in the operating position, each closing body longitudinally protrudes from the movable cover and, in the rest position, each closing body is arranged underneath the movable cover, and wherein each closing body is arranged in correspondence to the top of a fin of the cover.

18. The car according to claim 17, wherein each closing body is "L"-shaped and has an upper wall, which, in the operating position, is arranged on a corresponding hollow space and rests on the upper wall of one of the external vertical post of the frame and on the upper wall of one of the internal vertical post of the frame, and a front wall, which, in the operating position, is arranged in front of the hollow space and leans against a front edge of one of the two external vertical posts of the frame and against a front edge of one of the two internal vertical post of the frame.

19. A car comprising:
   a frame provided with two external vertical posts, which project from the belt line of the car and face each other on opposite sides of the car;
   a passenger compartment;
   a sun roof, which is supported by the frame and can be set to an open position or a closed position with respect to the passenger compartment;
   a means for housing the sun roof when the sun roof is in the open position;
   a means for closing the housing; and
   a rear window, which is mounted in a sliding manner so as to move between an extracted position, in which the rear window projects from the car body, and a withdrawn position, in which the rear window is housed inside the car body,
   wherein the sun roof comprises two rigid roof members which, when the sun roof is in the closed position, are substantially horizontal and substantially coplanar to each other so as to be seamlessly positioned one behind the other, and, when the sun roof is in the open position, are packed one on top of the other inside the housing;
   wherein the roof members are fitted to the frame by means of a pair of support members, which are arranged on opposite sides of the roof members; and
   wherein the frame comprises two internal vertical posts, which are arranged between the external vertical posts at a given distance from the external vertical posts themselves, so as to define, between each of the two external vertical posts and the corresponding internal vertical post, a hollow space, in which the support members of the roof members are arranged.

20. The car according to claim 19, wherein the support members of the roof members are mechanically connected to a structure consisting of the external vertical posts and of the internal vertical posts.

* * * * *